United States Patent
Park

(10) Patent No.: US 11,786,772 B2
(45) Date of Patent: Oct. 17, 2023

(54) AQUEOUS FIRE EXTINGUISHING AGENT

(71) Applicant: Myung Kyun Park, Incheon (KR)

(72) Inventor: Myung Kyun Park, Incheon (KR)

( * ) Notice: Subject to any disclaimer, the term of this patent is extended or adjusted under 35 U.S.C. 154(b) by 83 days.

(21) Appl. No.: 17/615,626

(22) PCT Filed: Nov. 26, 2021

(86) PCT No.: PCT/KR2021/017593
§ 371 (c)(1),
(2) Date: Dec. 1, 2021

(87) PCT Pub. No.: WO2022/149723
PCT Pub. Date: Jul. 14, 2022

(65) Prior Publication Data
US 2023/0166148 A1  Jun. 1, 2023

(30) Foreign Application Priority Data
Jan. 5, 2021 (KR) ........................ 10-2021-0000653

(51) Int. Cl.
*A62D 1/00* (2006.01)
*A62C 3/16* (2006.01)

(52) U.S. Cl.
CPC .............. *A62D 1/0042* (2013.01); *A62C 3/16* (2013.01)

(58) Field of Classification Search
CPC ................................ A62D 1/0042; A62C 3/16
See application file for complete search history.

(56) References Cited

U.S. PATENT DOCUMENTS 3,621,917 A * 11/1971 Rosen .................... C10L 1/006
516/14

FOREIGN PATENT DOCUMENTS

| CN | 101198381 A | 6/2008 | |
|---|---|---|---|
| CN | 108042967 A | 5/2018 | |
| CN | 109529246 A | 3/2019 | |
| GB | 1272481 A | 4/1972 | |
| JP | 2018122291 A * | 8/2018 | ........... G04G 15/006 |

OTHER PUBLICATIONS

English Translation of JP 201812291 (Year: 2018).*
Office Action from corresponding Chinese Patent Application No. 2023011002771920, dated Jan. 13, 2023.
Office Action from corresponding Taiwan Patent Application No. 11220332250, dated Apr. 13, 2023.

* cited by examiner

*Primary Examiner* — Andrew J. Oyer
(74) *Attorney, Agent, or Firm* — Harness, Dickey & Pierce, P.L.C.

(57) ABSTRACT

Provided is an aqueous fire extinguishing agent, and more particularly, an aqueous fire extinguishing agent which includes a non-electrolyte material, an anti-freezing agent, a silicone surfactant, and water and is adaptable to electrical fires. The aqueous fire extinguishing agent of the present invention is applicable to electrical fires and thus can effectively replace conventional powder fire extinguishers or gas-based fire extinguishers, and is eco-friendly in that it is harmless to the human body and the environment and does not cause secondary pollution due to powder or gas after use.

9 Claims, No Drawings

AQUEOUS FIRE EXTINGUISHING AGENT

CROSS-REFERENCE TO RELATED APPLICATION

This application is a national phase application of PCT Application No. PCT/KR2021/017593, filed on 26 Nov. 2021, which claims priority to and the benefit of Korean Patent Application No. 10-2021-0000653, filed with the Korean Intellectual Property Office on Jan. 5, 2021, the disclosure of which is incorporated herein by reference in its entirety.

TECHNICAL FIELD

The present invention relates to an aqueous fire extinguishing agent, and more particularly, to an aqueous fire extinguishing agent which is formulated by including a non-electrolyte material, an anti-freezing agent, a silicone surfactant, and water and thus is applicable not only to class A and class B fires, but also to class C fires (electrical fires).

BACKGROUND ART

In general, fires are classified into class A fires, class B fires, and class C fires.

Class A fires are caused by combustible materials such as wood or paper, and lowering the temperature below the flash point using an aqueous fire extinguisher is generally useful for extinguishing class A fires. Class B fires are caused by petroleum or oil, and the use of a $CO_2$ fire extinguisher, a Halon fire extinguisher, or a foam fire extinguisher is useful for extinguishing class B fires. Class C fires are caused by electricity, and blocking oxygen with $CO_2$ is the most useful way to extinguish class C fires.

A method applicable to all of class A fires, class B fires, and class C fires is to use a powder fire extinguisher (ABC powder) and a gas-based fire extinguisher. However, in the case of a powder fire extinguisher, there are significant advantages in terms of performance and price, but there are significant disadvantages in that solidification occurs during long-term storage, and after fire extinguishing, serious secondary damage occurs due to contamination by a powder fire extinguishing agent. In addition, in the case of a gas-based fire extinguisher, there is a risk of suffocation or environmental pollution such as ozone layer destruction after use depending on the gas composition, so the use of a gas-based fire extinguisher is gradually decreasing.

Therefore, there is a demand for the development of a general-purpose water-based fire extinguisher that is applicable to all of class A fires, class B fires, and class C fires.

Water is a useful fire extinguishing agent. This is because water has a very high specific heat (1 kcal/kg° C.) and thus is capable of absorbing a large amount of heat; has a large latent heat of evaporation (539 kcal/kg) and thus is capable of cooling combustibles by taking a large amount of heat from the surroundings while vaporizing; and has a large vaporization expansion rate (1,650 times) so the water vapor smothers the fire by covering the combustion surface, thus effectively extinguishing the fire. However, water having the above-described characteristics is effective against class A fires but cannot be used on class B fires or class C fires.

In order to improve the disadvantages, Korean Patent Registration No. 10-1300870 proposed an aqueous fire extinguishing agent including water, an alkyl acid phosphate, a glycol, a hydrocarbon-based surfactant, ammonia water, and the like, which is applicable to class B fires as well as class A fires. However, even this related-art could not be used on class C fires.

In addition, Korean Patent Registration No. 10-2043750 proposed a wetting fire extinguishing agent composition including a metal carbonate, a freezing-point depressant, a fluorine-based surfactant, urea, water, and the like, which is applicable to class B fires as well as class A fires. However, even this related-art could not be used on class C fires.

SUMMARY

Technical Problem

The present invention is directed to providing an aqueous fire extinguishing agent which is based on water and has high electrical resistance and thus is applicable to class C fires as well as class A fires and class B fires.

In addition, the present invention is directed to providing an eco-friendly aqueous fire extinguishing agent which is harmless to the human body and the environment and does not cause secondary pollution.

Technical Solution

One aspect of the present invention provides an aqueous fire extinguishing agent, which includes a non-electrolyte material, an anti-freezing agent, a silicone surfactant or a silicon oil, and water, and is adaptable to electrical fires.

The fire extinguishing agent includes 5 to 15 wt % of the non-electrolyte material, 25 to 40 wt % of the anti-freezing agent, and 1 to 10 wt % of the silicone surfactant or silicon oil, with the remainder being water.

The non-electrolyte material may be one or more selected from among glucose, ethanol, acetone, glycerin, starch, cellulose, urea, sugar, and protein.

The anti-freezing agent may be a mixture of ethylene glycol, propylene glycol, and dipropylene glycol mixed in a weight ratio of 1 to 3:2 to 6:1.

The silicone surfactant is one or more selected from among PEG-12 dimethicone, PEG11 methyl ether dimethicone, PEG-10 dimethicone, cetyl PEG/PPG-10/1 dimethicone, cyclopentasiloxane (and) PEG/PPG-18/18 dimethicone, lauryl PEG-8 dimethicone, a lauryl dimethicone/polyglycerin-3 crosspolymer, lauryl polyglceryl-3 polydemithylsiloxyethyl dimethicone, polyglyceryl-3 polydimethylsiloxyethyl dimethicone, polyglyceryl-3 disiloxane dimethicone, and a dimethicone/polyglyceryl-3 crosspolymer.

The silicone oil may be one or more selected from among hexamethyldisiloxane, heptylpentamethyldisiloxane, hexaethyldisiloxane, pentamethyloctyldisiloxane, pentamethylpentyldisiloxane, butylpentamethyldisiloxane, pentaethylmethyldisiloxane, hexylpentamethyldisiloxane, heptamethyltrisiloxane, octamethyltrisiloxane, decamethyltetrasiloxane, dodecamethylpentasiloxane, dimethylpolysiloxane, methylphenylpolysiloxane, diphenylpolysiloxane, a dimethylsiloxane block copolymer, a polyether-polymethylsiloxane copolymer, polyethoxylated dimethylsiloxane, a polyoxypropylene-polyoxyethylene block copolymer, and a silicone-polyether copolymer.

The non-electrolyte material is glucose, and the anti-freezing agent is a mixture of ethylene glycol, propylene glycol, and dipropylene glycol mixed in a weight ratio of 2:4:1.

The aqueous fire extinguishing agent additionally includes 0.01 to 1 wt % of a corrosion inhibitor and 0.01 to 1 wt % of an antifoaming agent, wherein the corrosion inhibitor is sodium silicate, and the antifoaming agent is a dimethylpolysiloxane-based silicone antifoaming agent.

Advantageous Effects

An aqueous fire extinguishing agent of the present invention is applicable to electrical fires and thus can effectively replace conventional powder fire extinguishers or gas-based fire extinguishers, and is eco-friendly in that it is harmless to the human body and the environment and does not cause secondary pollution due to powder or gas after use.

DETAILED DESCRIPTION

Hereinafter, the present invention will be described in detail.

Most importantly, the present invention is adaptable to electrical fires unlike the conventional aqueous fire extinguishing agents, and does not cause secondary environmental pollution.

An aqueous fire extinguishing agent of the present invention includes a non-electrolyte material, an anti-freezing agent, a silicone surfactant, and water and is adaptable to electrical fires.

First, the aqueous fire extinguishing agent of the present invention is based on water, more specifically, deionized distilled water, and since it is based on water, it does not cause secondary pollution after use, and has low unit manufacturing costs and thus can be commercialized.

The non-electrolyte material is used for preparing a non-electrolyte solution, in which the transfer of electric charge is suppressed, by mixing with water so that electrical conductivity is remarkably lowered, that is, electrical resistance is increased, so as to impart adaptability to electrical fires.

In the present invention, as the non-electrolyte material, one or more selected from among glucose, ethanol, acetone, glycerin, starch, cellulose, urea, sugar, and protein can be used, and most preferably, glucose is used. This is because glucose has the highest adaptability to electrical fires.

The anti-freezing agent is used for solving the problem that water is frozen and cannot be used at a temperature below its freezing point, and may be one or more of ethylene glycol, propylene glycol, and dipropylene glycol. However, the ethylene glycol alone provides the desired level of an anti-freezing effect only when used in a large amount, in which case, the viscosity of the fire extinguishing agent is excessively increased, making it difficult to discharge the fire extinguishing agent, and the propylene glycol and the dipropylene glycol are expensive, so using only the propylene glycol or dipropylene glycol increases unit product costs. Therefore, in consideration of an anti-freezing effect, unit product costs, viscosity, and the like, the ethylene glycol, propylene glycol, and dipropylene glycol are preferably mixed in the weight ratio of 1 to 3:2 to 6:1 and more preferably mixed in the weight ratio of 2:4:1, and used. When the weight ratio of the ethylene glycol, propylene glycol, and dipropylene glycol is 1 to 3:2 to 6:1, fire extinguishing performance is excellent.

The silicone surfactant is used for lowering the surface tension of water in the case of a class B fire, that is, an oil fire, in order to prevent the layer separation of water and oil during a fire, and for providing a smothering effect by forming an emulsion on the oil surface to effectively extinguish the oil fire. In addition, during the suppression of a general fire, the silicone surfactant has the effect of cooling and smothering a fire by maximizing penetration by lowering surface tension.

The silicone surfactant is one or more selected from among PEG-12 dimethicone, PEG11 methyl ether dimethicone, PEG-10 dimethicone, cetyl PEG/PPG-10/1 dimethicone, cyclopentasiloxane (and) PEG/PPG-18/18 dimethicone, lauryl PEG-8 dimethicone, a lauryl dimethicone/polyglycerin-3 crosspolymer, lauryl polyglceryl-3 polydemithylsiloxyethyl dimethicone, polyglyceryl-3 polydimethylsiloxyethyl dimethicone, polyglyceryl-3 disiloxane dimethicone, and a dimethicone/polyglyceryl-3 crosspolymer.

As described above, the aqueous fire extinguishing agent including a non-electrolyte material, an anti-freezing agent, a silicone surfactant or a silicone oil, and water is applicable not only to general fires but also to oil fires and electrical fires, is harmless to the human body due to including eco-friendly ingredients, does not cause secondary pollution, and has low unit manufacturing costs and thus can be commercialized. In addition, the aqueous fire extinguishing agent can effectively replace conventional powder fire extinguishers and gas-based fire extinguishers.

Meanwhile, the specific composition ratio of the aqueous fire extinguishing agent of the present invention is preferably 5 to 15 wt % of the non-electrolyte material, 25 to 40 wt % of the anti-freezing agent, and 1 to 10 wt % of the silicone surfactant or silicone oil, with the remainder being water. This is because when less than 5 wt % of the non-electrolyte material is included, electrical resistance is low, so the aqueous fire extinguishing agent cannot be applied to electrical fires, and when more than 15 wt % of the non-electrolyte material is included, it is not economical because additional effects are not exhibited; when less than 25 wt % of the anti-freezing agent is included, an anti-freezing effect is not sufficiently exhibited, and when more than 40 wt % of the anti-freezing agent is included, there is a problem in the discharge of the fire extinguishing agent due to an increase in viscosity, and unit manufacturing costs are increased; when less than 1 wt % of the silicone surfactant is included, a change in the surface tension of water is insignificant, so an incidental effect of fire extinguishing is insignificant, and when more than 10 wt % of the silicone surfactant is included, the fire extinguishing agent is discharged in the form of a foam, and thus a discharge distance and discharge amount are affected.

Meanwhile, the fire extinguishing agent of the present invention may additionally include 0.01 to 1 wt % of a corrosion inhibitor and 0.01 to 1 wt % of an antifoaming agent.

The corrosion inhibitor is used for preventing the corrosion of surrounding objects due to the spraying of the fire extinguishing agent as well as for preventing the corrosion of a fire extinguisher container in which the fire extinguishing agent is stored, and may be sodium silicate.

When less than 0.01 wt % of the corrosion inhibitor is included, the effect of the corrosion inhibitor is insignificant, and even when more than 1 wt % of the corrosion inhibitor is included, the effect is not further improved. Therefore, it is preferable that 0.01 to 1 wt % of the corrosion inhibitor is included.

The antifoaming agent is used for preventing the foaming of the fire extinguishing agent, and any dimethylpolysiloxane-based silicone antifoaming agent can be applied regardless of type.

In addition, when less than 0.01 wt % of the antifoaming agent is included, the effect of the antifoaming agent is insignificant, and even when more than 1 wt % of the antifoaming agent is included, the effect is not further improved. Therefore, it is preferable that 0.01 to 1 wt % of the antifoaming agent is included.

Hereinafter, a method of manufacturing an aqueous fire extinguishing agent of the present invention will be briefly described.

First, ingredients weighed according to a composition ratio are provided, and then an anti-freezing agent and a silicone surfactant are added to a portion of the provided water to prepare a mixed solution.

Subsequently, a non-electrolyte material is added to the remainder of the provided water to prepare a non-electrolyte solution.

Subsequently, the mixed solution and the non-electrolyte solution are mixed to complete the preparation of a fire extinguishing agent.

In addition, when it is desired to additionally add a corrosion inhibitor and an antifoaming agent, the corrosion inhibitor and the antifoaming agent are additionally added to the above-prepared fire extinguishing agent to complete the preparation of an aqueous fire extinguishing agent.

Hereinafter, the present invention will be described in detail through Examples.

Example 1

To 16.6 g of deionized distilled water, 10 g of ethylene glycol, 20 g of propylene glycol, and 5 g of dipropylene glycol, and 5 g of PEG-12 dimethicone as a silicone surfactant were added and stirred to prepare a mixed solution.

Subsequently, 10 g of glucose was added to 33.4 g of deionized distilled water and stirred until complete dissolution, and the above-prepared mixed solution was added and stirred to obtain an aqueous fire extinguishing agent.

Example 2

An aqueous fire extinguishing agent was prepared in the same manner as in Example 1 except that 5 g of glucose was added to 38.4 g of deionized distilled water.

Example 3

An aqueous fire extinguishing agent was prepared in the same manner as in Example 1 except that 15 g of glucose was added to 28.4 g of deionized distilled water.

Example 4

To 16.6 g of deionized distilled water, 10 g of ethylene glycol, 20 g of propylene glycol, 10 g of dipropylene glycol, and 5 g of PEG-10 dimethicone as a silicone surfactant were added and stirred to prepare a mixed solution.

Subsequently, 10 g of glucose was added to 28.4 g of deionized distilled water and stirred until complete dissolution, and the above-prepared mixed solution was added and stirred to obtain an aqueous fire extinguishing agent.

Example 5

To 16.6 g of deionized distilled water, 18 g of ethylene glycol, 12 g of propylene glycol, 6 g of dipropylene glycol, and 5 g of cetyl PEG/PPG-10/1 dimethicone as a silicone surfactant were added and stirred to prepare a mixed solution.

Subsequently, 10 g of glucose was added to 32.4 g of deionized distilled water and stirred until complete dissolution, and the above-prepared mixed solution was added and stirred to obtain an aqueous fire extinguishing agent.

Example 6

To 16.6 g of deionized distilled water, 5 g of ethylene glycol, 30 g of propylene glycol, 5 g of dipropylene glycol, and 5 g of PEG-11 methyl ether dimethicone as a silicone surfactant were added and stirred to prepare a mixed solution.

Subsequently, 10 g of glucose was added to 28.4 g of deionized distilled water and stirred until complete dissolution, and the above-prepared mixed solution was added and stirred to obtain an aqueous fire extinguishing agent.

Example 7

To 16.6 g of deionized distilled water, 9 g of ethylene glycol, 18 g of propylene glycol, 3 g of dipropylene glycol, and 5 g of cetyl PEG/PPG-10/1 dimethicone as a silicone surfactant were added and stirred to prepare a mixed solution.

Subsequently, 10 g of glucose was added to 38.4 g of deionized distilled water and stirred until complete dissolution, and the above-prepared mixed solution was added and stirred to obtain an aqueous fire extinguishing agent.

Example 8

To 16.6 g of deionized distilled water, 10 g of ethylene glycol, 20 g of propylene glycol, 5 g of dipropylene glycol, and 5 g of heptamethyltrisiloxane as a silicone oil were added and stirred to prepare a mixed solution.

Subsequently, 10 g of glucose was added to 38.4 g of deionized distilled water and stirred until complete dissolution, and the above-prepared mixed solution was added and stirred to obtain an aqueous fire extinguishing agent.

Example 9

To 16.6 g of deionized distilled water, 10 g of ethylene glycol, 20 g of propylene glycol, 5 g of dipropylene glycol, and 5 g of a dimethylsiloxane block copolymer as a silicone oil were added and stirred to prepare a mixed solution.

Subsequently, 10 g of glucose was added to 38.4 g of deionized distilled water and stirred until complete dissolution, and the above-prepared mixed solution was added and stirred to obtain an aqueous fire extinguishing agent.

Comparative Example 1

To 16.6 g of deionized distilled water, 10 g of ethylene glycol, 20 g of propylene glycol, 5 g of dipropylene glycol, and 5 g of PEG-12 dimethicone as a silicone surfactant were added and stirred to prepare a mixed solution.

Subsequently, 3 g of glucose was added to 40.4 g of deionized distilled water and stirred until complete dissolution, and the above-prepared mixed solution was added and stirred to obtain an aqueous fire extinguishing agent.

Comparative Example 2

To 16.6 g of deionized distilled water, 10 g of ethylene glycol, 20 g of propylene glycol, 5 g of dipropylene glycol, and 5 g of PEG-12 dimethicone as a silicone surfactant were added and stirred to prepare a mixed solution.

Subsequently, 20 g of glucose was added to 23.4 g of deionized distilled water and stirred until complete dissolution, and the above-prepared mixed solution was added and stirred to obtain an aqueous fire extinguishing agent.

Experimental Example 1

The adaptability of Example 1 to electrical fires was tested in accordance with Article 4 (capability unit) of Korea Fire Institute (KFI) test standards. KFI was commissioned to verify fire extinguisher adaptability to electrical fires.

The electrical conductivity of class C fire extinguishers should satisfy the condition that the conduction current through which a fire extinguishing agent is sprayed is 0.5 mA or less under the following separation distance (referring to the separation distance between the tip of a fire extinguisher spraying nozzle and the center of a metal plate) and application voltage conditions:

1. When the separation distance is 50 cm, AC (35±3.5) kV
2. When the separation distance is 90 cm, AC (100±10) kV Test conditions: temperature=(17.3±1.7)° C., humidity=(49±14)% R.H The results are shown in FIG. 1.

Referring to FIG. 1, in the case of Example 1 of the present invention, the conduction current was 0.1 mA under the conditions of a separation distance of 50 cm and a voltage of AC (35±3.5) kV and 0.1 mA under the conditions of a separation distance of 90 cm and a voltage of AC (100±10) kV, and it can be seen that Example 1 of the present invention has passed the verification of fire extinguisher adaptability to electrical fires.

Experimental Example 2

The class A and B fire extinguishing performance of Example 1 was evaluated as follows.

Class A fire 1: After stacking 90 pieces of dry pine and alder wood having a size of 30 mm×35 mm×730 mm (width×height×length; one unit) in a grid fashion and allowing the same to burn for three minutes, the fire was extinguished with a fire extinguisher charged with 3 L of a fire extinguishing agent. Fire extinguishing performance was evaluated based on whether reignition occurred two minutes after the completion of fire extinguishing.

Class A fire 2: After stacking 144 pieces of dry pine and alder wood having a size of 30 mm×35 mm×900 mm (width×height×length; two units) in a grid fashion and allowing the same to burn for three minutes, the fire was extinguished with a fire extinguisher charged with 3 L of a fire extinguishing agent. Fire extinguishing performance was evaluated based on whether reignition occurred two minutes after the completion of fire extinguishing.

Class B fire 1: After filling a fire extinguishing test model having a size of 44.7 cm×44.7 cm×30 cm (width×height×length; one unit) with water to a height of 120 mm and then with gasoline to an additional height of 30 mm and allowing the model to burn for one minute, the fire was extinguished with a fire extinguisher charged with 3 L of a fire extinguishing agent. Fire extinguishing performance was evaluated based on whether reignition occurred one minute after the completion of spraying.

Class B fire 2: After filling a fire extinguishing test model having a size of 77.5 cm×77.5 cm×30 cm (width×height×length; three units) with water to a height of 120 mm and then with gasoline to an additional height of 30 mm and allowing the model to burn for one minute, the fire was extinguished with a fire extinguisher charged with 3 L of a fire extinguishing agent. Fire extinguishing performance was evaluated based on whether reignition occurred one minute after the completion of spraying.

The results are shown in the following Table 1 and Table 2.

TABLE 1

| Classification | Example 1 |
| --- | --- |
| Class A fire 1 | Completely extinguished, not reignited |
| Class A fire 2 | Completely extinguished, not reignited |
| Class B fire 1 | Completely extinguished, not reignited |
| Class B fire 2 | Completely extinguished, not reignited |

Referring to Table 1, it can be seen that Example 1 of the present invention has excellent fire extinguishing performance against class A fires and class B fires.

Experimental Example 3

Class A fire extinguishing performance: In order to evaluate the class A fire extinguishing performance of Examples 1 to 9 and Comparative Examples 1 and 2, 90 pieces of pine and alder wood having a size of 30 mm×35 mm×730 mm (width×height×length; one unit) were stacked in a grid fashion and allowed to burn for three minutes, and the fire was extinguished with a fire extinguisher charged with 3 L of the fire extinguishing agent.

○: Fire was extinguished within 45 seconds
X: Fire was not extinguished within 45 seconds Class B fire extinguishing performance: In order to evaluate the class B fire extinguishing performance of Examples 1 to 9 and Comparative Examples 1 and 2, a fire extinguishing test model having a size of 44.7 cm×44.7 cm×30 cm (width×height×length; one unit) was filled with water to a height of 120 mm and then with gasoline to an additional height of 30 mm and allowed to burn for one minute, and the fire was extinguished with a fire extinguisher charged with 3 L of the fire extinguishing agent.

○: Fire was extinguished with 2 L of the fire extinguishing agent or less
X: Fire was not extinguished even with 3 L of the fire extinguishing agent Class C fire extinguishing performance: Electrical conductivity was tested under the conditions of a temperature of 17.3±1.7° C. and a humidity of 49±14% in accordance with Article 4 of the technical standards for type approval of fire extinguisher and product inspection (Republic of Korea). A conduction current through which a fire extinguishing agent was sprayed under the following separation distance (referring to the separation distance between the tip of a fire extinguisher spraying nozzle and the center of a metal plate) and application voltage conditions was measured.

When the separation distance is 50 cm, AC (35±3.5) kV
When the separation distance is 90 cm, AC (100±10) kV ○: 0.5 mA or less at both the separation distance of 50 cm and the separation distance of 90 cm
X: More than 0.5 mA at both the separation distance of 50 cm and the separation distance of 90 cm In the case of Example 1, a conduction current of 0.1 mA was measured when the separation distance was 50 cm, and a conduction current of 0.1 mA was measured when the separation distance was 90 cm.

Anti-freezing performance: The anti-freezing performance of Examples 1 to 9 and Comparative Examples 1 and 2 was evaluated based on whether they were frozen after being stored at −20° C. for 24 hours.

○: Not frozen
X: Frozen

TABLE 2

|  | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Class A fire | ○ | ○ | ○ | ○ | ○ | ○ | ○ | ○ | ○ | ○ | ○ |
| Class B fire | ○ | ○ | ○ | ○ | ○ | ○ | ○ | ○ | ○ | ○ | ○ |
| Class C fire | ○ | ○ | ○ | ○ | ○ | ○ | ○ | ○ | ○ | X | ○ |
| Anti-freezing | ○ | ○ | ○ | ○ | ○ | ○ | ○ | ○ | ○ | ○ | ○ |

In the case of Comparative Example 1, it can be seen that electricity was conducted because the amount of glucose, which is a non-insulating material, was small. In the case of Comparative Example 2, there was a problem that glucose was precipitated due to supersaturation, lowering nozzle performance when spraying the fire extinguishing agent.

Based on the results of Experimental Examples 1, 2, and 3, it can be seen that an aqueous fire extinguishing agent of the present invention is applicable not only to class A fires and class B fires, but also to class C fires, and thus can be used in various fire prevention fields in the future.

It is apparent to those skilled in the art that the present invention is not limited to the exemplary embodiments described above and that various modifications and variations are possible without departing from the spirit and scope of the present invention. Accordingly, such variations or modifications fall within the scope of the claims of the present invention.

What is claimed is:

1. An aqueous fire extinguishing agent comprising:
   a non-electrolyte material;
   an anti-freezing agent;
   a silicone surfactant or a silicone oil; and
   water,
   wherein the anti-freezing agent is a mixture of ethylene glycol, propylene glycol, and dipropylene glycol mixed in a weight ratio of 1 to 3:2 to 6:1, and
   wherein the aqueous fire extinguishing agent is adaptable to electrical fires.

2. The aqueous fire extinguishing agent of claim 1, wherein the fire extinguishing agent includes:
   5 wt % to 15 wt % of the non-electrolyte material;
   25 wt % to 40 wt % of the anti-freezing agent;
   1 wt % to 10 wt % of the silicone surfactant or silicone oil; and
   water as the remainder.

3. The aqueous fire extinguishing agent of claim 1, wherein the non-electrolyte material is one or more selected from among glucose, ethanol, acetone, glycerin, starch, cellulose, urea, sugar, and protein.

4. The aqueous fire extinguishing agent of claim 1, wherein the silicone surfactant is one or more selected from among PEG-12 dimethicone, PEG11 methyl ether dimethicone, PEG-10 dimethicone, cetyl PEG/PPG-10/1 dimethicone, cyclopentasiloxane (and) PEG/PPG-18/18 dimethicone, lauryl PEG-8 dimethicone, a lauryl dimethicone/polyglycerin-3 crosspolymer, lauryl polyglceryl-3 polydemithylsiloxyethyl dimethicone, polyglyceryl-3 polydimethylsiloxyethyl dimethicone, polyglyceryl-3 disiloxane dimethicone, and a dimethicone/polyglyceryl-3 crosspolymer.

5. The aqueous fire extinguishing agent of claim 1, wherein the silicone oil is one or more selected from among hexamethyldisiloxane, heptylpentamethyldisiloxane, hexaethyldisiloxane, pentamethyloctyldisiloxane, pentamethylpentyldisiloxane, butylpentamethyldisiloxane, pentaethylmethyldisiloxane, hexylpentamethyldisiloxane, heptamethyltrisiloxane, octamethyltrisiloxane, decamethyltetrasiloxane, dodecamethylpentasiloxane, dimethylpolysiloxane, methylphenylpolysiloxane, diphenylpolysiloxane, a dimethylsiloxane block copolymer, a polyether-polymethylsiloxane copolymer, polyethoxylated dimethylsiloxane, a polyoxypropylene-polyoxyethylene block copolymer, and a silicone-polyether copolymer.

6. The aqueous fire extinguishing agent of claim 1, wherein the non-electrolyte material is glucose, and the anti-freezing agent is a mixture of ethylene glycol, propylene glycol, and dipropylene glycol mixed in a weight ratio of 2:4:1.

7. The aqueous fire extinguishing agent of claim 2, further comprising:
   0.01 wt % to 1 wt % of a corrosion inhibitor; and
   0.01 wt % to 1 wt % of an antifoaming agent.

8. The aqueous fire extinguishing agent of claim 7, wherein the corrosion inhibitor is sodium silicate.

9. The aqueous fire extinguishing agent of claim 7, wherein the antifoaming agent is a dimethylpolysiloxane-based silicone antifoaming agent.

* * * * *